United States Patent [19]
Sasaki et al.

[11] Patent Number: 5,594,394
[45] Date of Patent: Jan. 14, 1997

[54] ANTENNA DIVERSITY SWITCHING DEVICE WITH SWITCHING CIRCUITS BETWEEN THE RECEIVER TERMINAL AND EACH ANTENNA

[75] Inventors: Atsushi Sasaki, Toyonaka; Toshio Ishizaki, Kobe; Hiroshi Takahashi, Neyagawa; Tooru Sakuragawa, Osaka; Hideaki Nakakubo, Kyoto; Ikuo Ohta, Hirakata; Tsutomu Matsumura, Yao; Hiroaki Kosugi; Naoki Yuda, both of Hirakata; Youichi Morinaga, Yokohama, all of Japan

[73] Assignee: Matsushita Electric Industrial Co., Ltd., Osaka, Japan

[21] Appl. No.: 298,461

[22] Filed: Aug. 30, 1994

[30] Foreign Application Priority Data

Aug. 31, 1993 [JP] Japan ................................. 5-215523
May 23, 1994 [JP] Japan ................................. 6-108724

[51] Int. Cl.⁶ .................................................... H01P 1/15
[52] U.S. Cl. .......................... 333/103; 333/104; 333/202; 455/78; 455/277.1
[58] Field of Search ............................ 333/100, 101, 333/103, 104, 202; 455/78, 79, 275, 277.1

[56] References Cited

U.S. PATENT DOCUMENTS

| | | | |
|---|---|---|---|
| 4,677,688 | 6/1987 | Yoshihara et al. | 333/103 X |
| 4,803,447 | 2/1989 | Schultz et al. | 333/103 |
| 4,823,098 | 4/1989 | Demuro et al. | 455/78 X |
| 4,914,714 | 4/1990 | Tamura | 455/78 |
| 5,023,866 | 6/1991 | Demuro | 333/134 X |
| 5,047,674 | 9/1991 | Clark et al. | 333/103 X |
| 5,054,114 | 10/1991 | Erickson | 455/78 |
| 5,060,293 | 10/1991 | Kok et al. | 333/103 X |
| 5,109,536 | 4/1992 | Kommrusch | 333/202 X |
| 5,166,857 | 11/1992 | Avanic et al. | 455/78 X |
| 5,193,218 | 3/1993 | Shimo | 333/103 X |
| 5,241,693 | 8/1993 | Kim et al. | 333/202 X |

FOREIGN PATENT DOCUMENTS

| | | |
|---|---|---|
| 0373803 | 6/1990 | European Pat. Off. . |
| 60-124146 | 8/1985 | Japan . |
| 0104324 | 3/1991 | Japan ................................. 455/78 |
| 6-77707 | 3/1994 | Japan . |
| WO85/00480 | 1/1985 | WIPO . |
| WO90/06020 | 5/1990 | WIPO . |

OTHER PUBLICATIONS

D. Bryant, "A Monolithic Reduced-Size Ku-Band SPDT FET Switch", *IEEE MTT International Microwave Symposium Digest*, pp. 371-374 (1988). No month.
European Search Report dated Aug. 14, 1995.

*Primary Examiner*—Benny T. Lee
*Assistant Examiner*—Justin P. Bettendorf
*Attorney, Agent, or Firm*—Ratner & Prestia

[57] ABSTRACT

An antenna switching device of the present invention includes: a transmitting terminal for receiving a transmitting signal; a first antenna terminal connected to a first antenna; a second antenna terminal connected to a second antenna; a receiving terminal for outputting receiving signals received at the first antenna terminal and the second antenna terminal; a selecting unit for selecting one mode among a first mode for outputting a signal corresponding to the transmitting signal to the first antenna terminal, a second mode for outputting the receiving signal received at the first antenna to the receiving terminal, and a third mode for outputting the receiving signal received at the second antenna to the receiving terminal.

37 Claims, 10 Drawing Sheets

FIG.7 PRIOR ART

- 601 First signal terminal
- 602 Second signal terminal
- 603 Third signal terminal
- 604 Control terminal
- 605, 606 (diodes)
- 607 (resistor)
- 608 (resistor)
- 609 (inductor)
- 610, 611, 612, 613 (capacitors)

ANTENNA DIVERSITY SWITCHING DEVICE WITH SWITCHING CIRCUITS BETWEEN THE RECEIVER TERMINAL AND EACH ANTENNA

BACKGROUND OF THE INVENTION

1. Field of the Invention

The present invention relates to an antenna switching device or an antenna switching duplexer for use in a radio communication apparatus such as a digital portable radio telephone performing radio communication by selectively connecting an antenna to a transmitter or a receiver, i.e., using a TDMA (time division multiple access) system.

2. Description of the Related Art

In the past, a single-pole double throw switch (hereinafter, referred to as an SPDT switch) has been used for selectively connecting an antenna to a transmitter or a receiver in mobile communication equipment. An exemplary conventional SPDT switch will be described with reference to FIG. 7.

FIG. 7 shows a circuit configuration of a conventional SPDT switch. The SPDT switch includes a first signal terminal 601, a second signal terminal 602, a third signal terminal 603, a control terminal 604, PIN (positive-intrinsic-negative) diodes 605 and 606, a strip line 607 having a ¼ wavelength of a signal frequency, a resistor 608, an inductor 609, and capacitors 610, 611, 612, and 613. The resistor 608, the inductor 609, and the capacitor 611 constitute a control circuit. One end of the capacitor 611 is connected to one end of the inductor 609, and the other end of the capacitor 611 is grounded. The capacitors 610, 612, and 613 function as direct-current blocking capacitors.

This conventional SPDT switch is used as a transmit-receive switch. The operation of the SPDT switch as a transmit-receive switch will be described. It is noted that in this case, the first, second, and third signal terminals 601, 602, and 603 work as a transmitting terminal, an antenna terminal, and a receiving terminal, respectively.

When a signal is transmitted from the antenna terminal, a positive voltage is applied to the control terminal 604. A control current flows through the control terminal 604, the resistor 608, the inductor 609, the PIN diode 605, the strip line 607, and the PIN diode 606 in this order. Associated with the flow of the control current, the impedance between an anode and a cathode of the PIN diodes 605 and 606 becomes low. The low impedance state between the anode and the cathode of the PIN diode 606 renders an electrical potential at one end of the strip line 607 connected to the anode of the PIN diode 606 at almost a ground level. This causes the impedance at the other end of the strip line 607 with respect to the antenna terminal 602 to be remarkably increased. As a result, a transmitting signal input from the transmitting terminal 601 is outputted from the antenna terminal 602 but is not outputted from the receiving terminal 603.

When a signal is received from the antenna terminal, no voltage is applied to the control terminal 604. Since no control current flows, the impedance between the anode and the cathode of the respective PIN diodes 605 and 606 becomes high. As a result, a receiving signal input from the antenna terminal 602 is outputted from the receiving terminal 503 but is not outputted from the transmitting terminal 601.

As described above, an antenna is selectively connected to a transmitter or a receiver by using the conventional SPDT switch.

However, in the case where the above-mentioned SPDT switch is applied to a diversity system capable of providing superior receiving characteristics in mobile radio communication, there arise problems. That is, since the diversity system utilizes two antennas, two SPDT switches are required for the system. In this case, the number of components included in a communication apparatus is increased, making it difficult to realize a miniaturized apparatus and rendering the loss of signal in the apparatus large.

SUMMARY OF THE INVENTION

The antenna switching device of this invention, comprises:

a transmitting terminal for receiving a transmitting signal;

a first antenna terminal connected to a first antenna;

a second antenna terminal connected to a second antenna;

a receiving terminal for outputting receiving signals received at the first antenna terminal and the second antenna terminal;

selecting means for selecting one mode among a first mode for outputting a signal corresponding to the transmitting signal to the first antenna terminal, a second mode for outputting the receiving signal received at the first antenna to the receiving terminal, and a third mode for outputting the receiving signal received at the second antenna to the receiving terminal.

According to the antenna switching device of the present invention, two SPDT switches are not required for reception and transmission, and at least one PIN diode can be omitted in a signal path from the first antenna terminal to the receiving terminal, compared with a switching device using two SPDT switches.

Thus, the invention described herein makes possible the advantage of providing a low-loss miniaturized antenna switching device capable of selectively connecting an antenna to a transmitter or a receiver and switching antennas for receiving a signal.

This and other advantages of the present invention will become apparent to those skilled in the art upon reading and understanding the following detailed description with reference to the accompanying figures.

BRIEF DESCRIPTION OF THE DRAWINGS

FIG. 7 is a circuit diagram of a conventional SPDT switch.

DESCRIPTION OF THE PREFERRED EMBODIMENTS

Hereinafter, the present invention will be described by way of illustrative examples with reference to the drawings.

EXAMPLE 1

Figure 1:
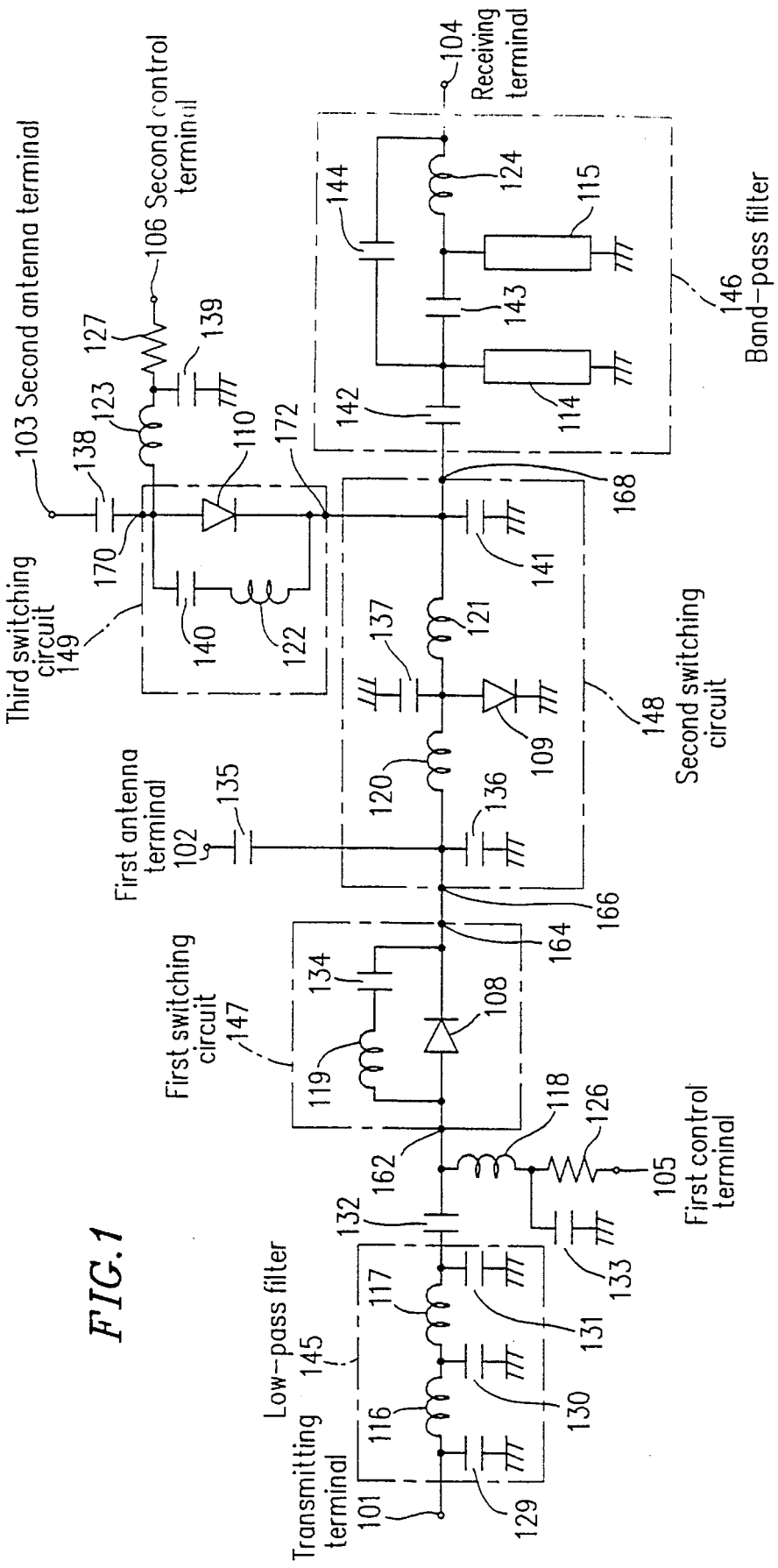
FIG. 1 is a circuit diagram of an antenna switching device of Example 1 according to the present invention.
Figure 2:
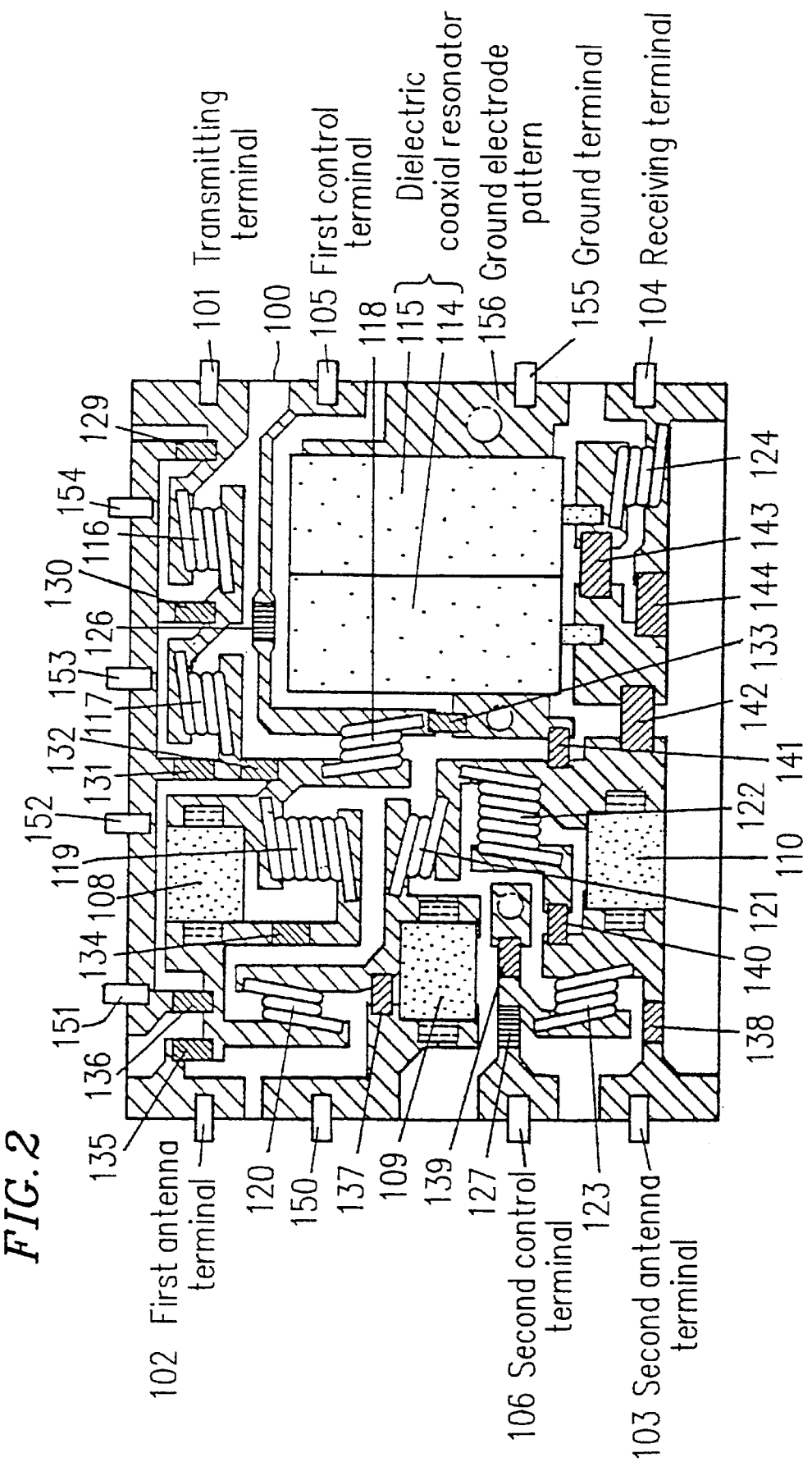
FIG. 2 is a plan view of the antenna switching device of Example 1 according to the present invention.

Referring to FIGS. 1 and 2, an antenna switching device of Example 1 according to the present invention includes a transmitting terminal 101 for receiving a transmitting signal, a first antenna terminal 102 connected to a first antenna, a second antenna terminal 103 connected to a second antenna, a receiving terminal 104 for outputting a receiving signal received from the first antenna terminal 102 and the second antenna terminal 103, a first control terminal 105 for receiving a first control signal, and a second control terminal 106 for receiving a second control signal. The antenna switching device further includes a first switching circuit 147, a second switching circuit 148, a third switching circuit 149, a low-pass filter 145 electrically connected between the transmitting terminal 101 and the first switching circuit 147, and a band-pass filter 146 electrically connected between the second switching circuit 148 and the receiving terminal 104. The first switching circuit 147 has an input terminal 162 electrically connected to the transmitting terminal 101 and a first output terminal 164 electrically connected to the first antenna terminal 102. The second switching circuit 148 has a second input terminal 166 electrically connected to the first antenna terminal 102, and a second output terminal 168 electrically connected to the receiving terminal 104. The third switching circuit 149 has a third input terminal 170 electrically connected to the second antenna terminal 103 and a third output terminal 172 electrically connected to the receiving terminal 104.

The first switching circuit 147, the second switching circuit 148, and the third switching circuit 149 constitute selecting means. The selecting means selects one mode among a first mode for outputting a signal corresponding to the transmitting signal to the first antenna terminal 102, a second mode for outputting a signal received at the first antenna to the receiving terminal 104, and a third mode for outputting a signal received at the second antenna to the receiving terminal 104. The selecting means selects the first mode when a voltage having the first level is supplied to the first control terminal 105, selects the third mode when a voltage having the second level is supplied to the second control terminal 106, and selects the second mode when a voltage is not supplied to the first and second control terminals 105 and 106.

In FIGS. 1 and 2, the reference numerals 108, 109, and 110 denote PIN diodes; 114 and 115 one end short-circuited dielectric coaxial resonators (dielectric resonators); 116, 117, 118, 119, 120, 121, 122, 123, and 124 inductors; 126 and 127 resistors; 129, 130, 131, 132, 133, 134, 135, 136, 137, 138, 139, 140, 141, 142, 143, and 144 capacitors; 150, 151, 152, 153, 154, and 155 ground terminals; and 156 a ground electrode pattern.

The inductors 116 and 117 end capacitors 129, 130, and 131 constitute the low-pass filter 145 which is a transmission filter. The low-pass filter 145 allows a signal having a frequency within and lower than a transmitting frequency band to pass therethrough and has high impedance with respect to higher harmonics of the transmitting signal. The dielectric resonators 114 and 115, the inductor 124, and the capacitors 142, 143, and 144 constitute the band-pass filter 146 which is a reception filter. The band-pass filter 146 allows a signal having a frequency within a receiving frequency band to pass therethrough and has high impedance with respect to signals having other frequencies.

The band-pass filter 146 includes a circuit portion electrically connected between the second antenna terminal 103 and the receiving terminal 104, and the dielectric resonators 114 and 115 each of which electrically connected between the receiving terminal 104 and the ground. In this example, the capacitors 142, 143, and 144, and the inductor 124 constitute the circuit portion of the band-pass filter 146.

The PIN diode 108, the inductor 119, and the capacitor 134 constitute the first switching circuit 147.

The PIN diode 109, the inductors 120 and 121, and the capacitors 136, 137, and 141 constitute the second switching circuit 148. In the second switching circuit 148, a forward voltage is applied to the PIN diode 109 to bring a low impedance state between an anode and a cathode thereof and a contact point between the inductors 120 and 121 is almost grounded. As a result, the inductor 120 and the capacitor 136 and the inductor 121 and the capacitor 141 respectively resonate in parallel with each other to bring extremely high impedance between the second input terminal 166 and the second output terminal 168.

The PIN diode 110, the inductor 122, and the capacitor 140 constitute the third switching circuit 149. A circuit constituted by the inductor 118, the resistor 126, and the capacitors 132 and 133 functions as an input matching circuit as well as a control circuit for the first switching circuit 147. A circuit constituted by the inductor 123, the resistor 127, the capacitors 138 and 139 function as an input matching circuit as well as a control circuit for the third switching circuit 149.

The capacitor 137 having appropriate capacitance contributes to the improvement of the impedance matching at the first antenna terminal 102 and the receiving terminal 104 when a signal is received at the first antenna terminal 102.

The low-pass filter 145 which is a transmission filter removes a higher harmonics component from the transmitting signal, thereby preventing the higher harmonics from being irradiated. A direct-current blocking capacitor is not required for a connecting point between the band-pass filter 146 and the third switching circuit 149 by using the capacitor 142 as an input coupling element of the band-pass filter 146. The band-pass filter 146 which is a reception filter removes unwanted signal components from the receiving signal. In the case where the band-pass filter 146 is made a polarized band-pass filter, the number of resonators of the band-pass filter 146 can be decreased compared with the case where the band-pass filter 146 is not polarized.

In the second switching circuit 148, one end of the inductor 120 and one end of the capacitor 136 are electrically connected to the second input terminal 166, and the other end of the capacitor 136 is grounded. The other end of the inductor 120 is electrically connected to one end of the PIN diode 109 and one end of the inductor 121. The other end of the PIN diode 109 is grounded. The other end of the inductor 121 and one end of the capacitor 141 are electrically connected to the second output terminal 168, and the other end of the capacitor 141 is grounded. The second switching circuit 148 can be miniaturized with such a configuration.

As shown in FIG. 2, the antenna switching device of this example includes a substrate 100 on which elements of the device are formed. The substrate 100 includes a first portion on which the low-pass filter 145 is formed, a second portion on which the circuit portion of the band-pass filter 146 is formed, and a third portion on which the dielectric resonators 114 and 118 are formed. The third portion of the substrate 180 is interposed between the first portion and the second portion. The transmitting terminal 101 is formed beside the low-pass filter 145, the ground terminal 155 and the ground electrode pattern 156 are formed beside the dielectric resonators 114 and 115, and the receiving terminal 104 is formed beside the circuit portion of the band-pass filter 146, on the substrate 100. Since the ground electrode pattern 156 connected to the ground terminal 155 and the dielectric resonators 114 and 115 are provided between the transmitting terminal 101 and the receiving terminal 104, the deterioration of the isolation between the transmitting terminal 101 and the receiving terminal 104 caused by the electromagnetic coupling between the low-pass filter 145 and the band-pass filter 146 can be prevented.

In the first switching circuit 147, a series circuit of the inductor 119 and the capacitor 134 is connected in parallel with the diode 108. The purpose of this connection is to increase the impedance between the first input terminal 162 and the first output terminal 164 of the first switching circuit 147 when the first switching circuit 147 is interrupted. In the case where the inductor 119 and the capacitor 134 are removed from the first switching circuit 147, the impedance between the first input terminal 162 and the first output terminal 164 is decreased. However, even in this case, the same function as the above can be realized.

Figure 8:
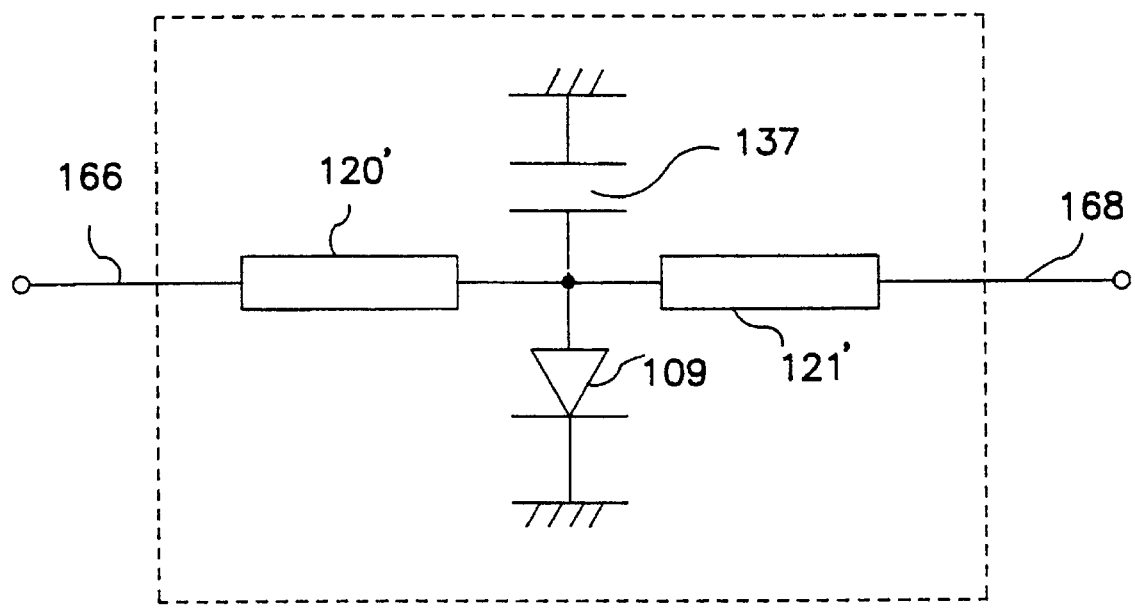
FIG. 8 is a circuit diagram of another embodiment of the second switching circuit for use in the antenna switching device of Example 1.

Even though a quarter-wave transmission section is substituted for either the inductor 120 and the capacitor 136 or the inductor 121 and the capacitor 141, or for both of them as shown in FIG. 8, the same function can be realized. In this case, a specific effect can be obtained, that is, the loss of the receiving signal at a time when the receiving signal is received at the first antenna terminal 102 is reduced.

Hereinafter, the operation of the antenna switching device of the present example will be described.

When the transmitting signal is transmitted (first mode), a positive voltage is applied to the first control terminal 105, and no voltage is applied to the second control terminal 106. A control current flows through the first control terminal 105, the resistor 126, the inductor 118, the first switching circuit 147, the inductor 120, and the PIN diode 109 in this order. Associated with the flow of the control current, the impedance between the first input terminal 162 and the first output terminal 164 of the first switching circuit 147 and between an anode and a cathode of the PIN diode 109 becomes low. The low impedance state between the anode and the cathode of the PIN diode 109 renders a contact point between the inductors 120 and 121 almost grounded. Because of this,, the inductor 120 and the capacitor 136 and the inductor 121 and the capacitor 141 respectively resonate in parallel with each other to bring extremely high impedance between the second input terminal 166 and the second output terminal 168 in the second switching circuit 148. Consequently, the transmitting signal input from the transmitting terminal 101 is outputted from the first antenna terminal 102 but is not outputted from the other terminals.

The antenna switching device of the present example has two receiving modes in addition to the above-mentioned transmitting mode. These receiving modes are classified into that receiving a signal from the first antenna terminal 102 (second mode) and that receiving a signal from the second antenna terminal 103 (third mode).

First, the operation of the mode for receiving a signal from the first antenna terminal 102 will be described.

When a signal is received from the first antenna terminal 102, no voltage is applied to the first control terminal 105 and the second control terminal 105. Since no control current flows through the device, the impedance between the first input terminal 162 and the first output terminal 164 of the first switching circuit 147, between the third input terminal 170 and the third output terminal 172 of the third switching circuit 149, and between the anode and the cathode of the PIN diode 109 becomes high. As a result, the receiving signal input from the first antenna terminal 102 is outputted from the receiving terminal 104 but is not outputted from the other terminals.

Next, the operation of the mode receiving a signal at the second antenna terminal 103 will be described.

When a signal is received from the second antenna terminal 103, no voltage is applied to the first control terminal 105, and a positive voltage is applied to the second control terminal 106. A control current flows through the second control terminal 105, the resistor 127, the inductor 123, the third switching circuit 149, the inductor 121, and the PIN diode 109 in this order. Associated with the flow of the control current, the impedance between the first input terminal 162 and the first output terminal 164 in the first switching circuit 147 becomes high, and the impedance between the third input terminal 170 and the third output terminal 172 of the third switching circuit 149 and between the anode and the cathode of the PIN diode 109 becomes low. The low impedance state between the anode and the cathode of the PIN diode 109 renders the contact point of the inductors 120 and 121 almost grounded. Because of this, the inductor 120 and the capacitor 136 and the inductor 121 and the capacitor 141 resonate in parallel with each other to bring extremely high impedance between the second input terminal 166 and the second output terminal 168 in the second switching circuit 148. Consequently, the receiving signal input from the second antenna terminal 103 is outputted from the receiving terminal 104, but is not outputted from the other terminals.

In the antenna switching device of Example 1 according to the present invention having the above-mentioned construction and function, at least one PIN diode element can be omitted in a signal path from the first antenna terminal 102 to the receiving terminal 104, unlike the switching device using two SPDT switches. Furthermore, according to the present invention, a low-loss miniaturized antenna switching device capable of selectively connecting an antenna to a transmitter or a receiver, removing unwanted signal components from the receiving signal by suppressing higher harmonics thereof, and switching antennas for reception can be obtained.

EXAMPLE 2

Figure 3:
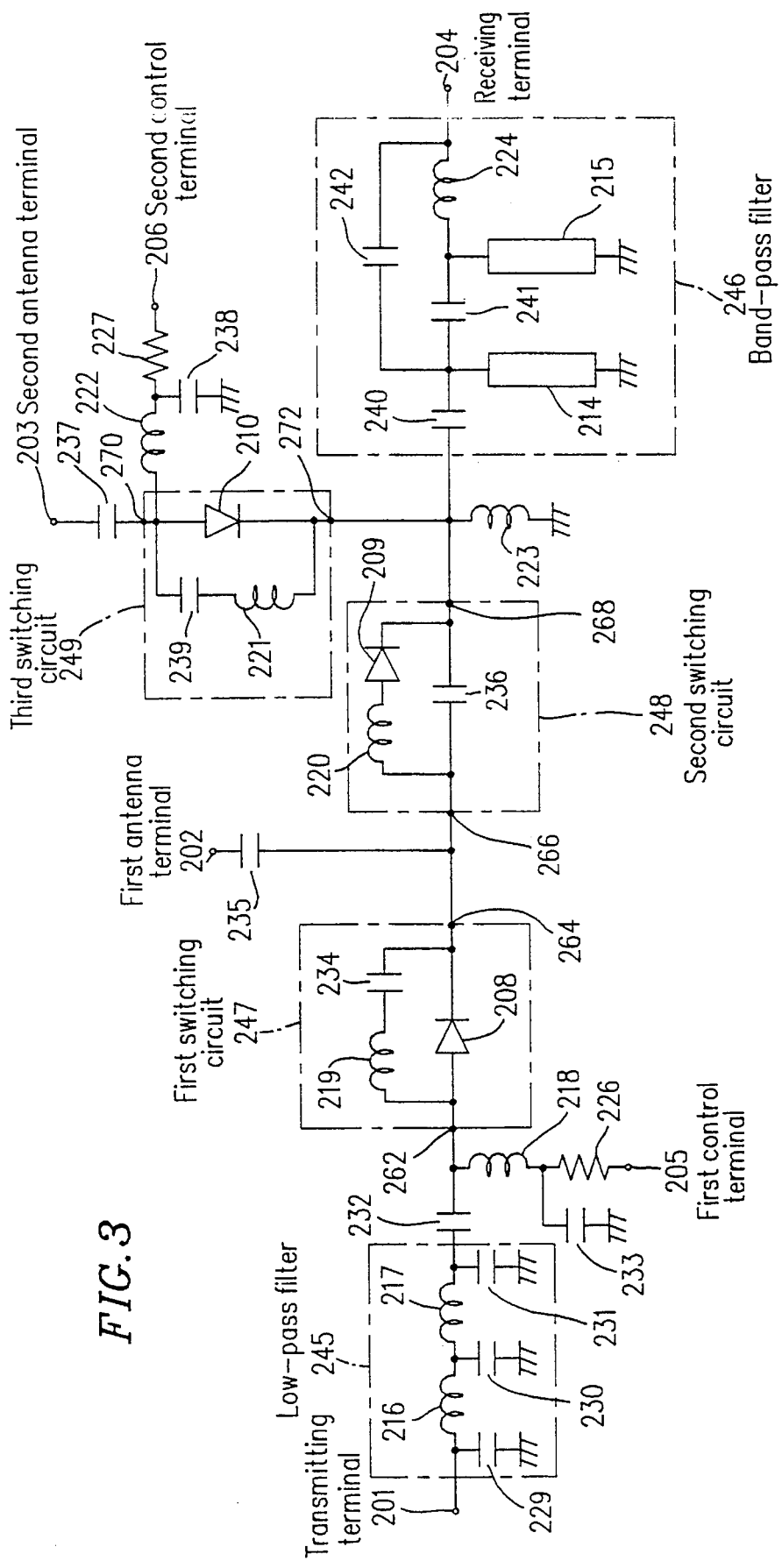
FIG. 3 is a circuit diagram of an antenna switching device of Example 2 according to the present invention.

Referring to FIG. 3, an antenna switching device of Example 2 according to the present invention includes a transmitting terminal 201 for receiving a transmitting signal, a first antenna terminal 202 connected to a first antenna, a second antenna terminal 203 connected to a second antenna, a receiving terminal 204 for outputting a receiving signal received from the first antenna terminal 202 and the second antenna terminal 203, a first control terminal 205 for receiving a first control signal, and a second control terminal 206 for receiving a second control signal. The antenna switching device further includes a first switching circuit 247, a second switching circuit 248, and a third switching circuit 249, a low-pass filter 245 electrically connected between the transmitting terminal 201 and the first switching circuit 247, and a band-pass filter 246 electrically connected between a second switching circuit 248 and the receiving terminal 204. The first switching circuit 247 has a first input terminal 262 electrically connected to he transmitting terminal 201 and a first output terminal 264 electrically connected to the first antenna terminal 202. The second switching circuit 248 has a second input terminal 266 electrically connected to the first antenna terminal 202, and a second output terminal 268 electrically connected to the receiving terminal 204. The third switching circuit 249 has a third input terminal 270 electrically connected to the second antenna terminal 203 and a third output terminal 272 electrically connected to the receiving terminal 204.

The first switching circuit 247, the second switching circuit 248, and the third switching circuit 249 constitute selecting means. The selecting means selects one mode among a first mode for outputting a signal corresponding to the transmitting signal to the first antenna terminal 202, a second mode for outputting a signal received at the first antenna to the receiving terminal 204, and a third mode for outputting a signal received at the second antenna to the receiving terminal 204. The selecting means selects the first mode when a voltage having a predetermined level is supplied to the first control terminal 205, selects the third mode when voltages having predetermined levels are supplied to the first and second control terminals 205 and 206, and selects the second mode when a voltage is not supplied to the first and second control terminals 205 and 206.

In FIG. 3, the reference numerals 208, 209, and 210 denote PIN diodes; 214 and 215 one end short-circuited dielectric coaxial resonators (dielectric resonators); 216, 217, 218, 219, 220, 221, 222, 223, and 224 inductors; 226 and 227 resistors; 229, 230, 231, 232, 233, 234, 235, 236, 237, 238, 239, 240, 241, and 242 capacitors.

The inductors 216 and 217 and capacitors 229, 230, and 231 constitute the low-pass filter 245. The low-pass filter 245 allows a signal having a frequency within and lower than a transmitting frequency band to pass therethrough and has high impedance with respect to higher harmonics of the transmitting signal. The dielectric resonators 214 and 215, the inductor 224, and the capacitors 240, 241, and 242 constitute the band-pass filter 246. The band-pass filter 246 allows a signal having a frequency within a receiving frequency band to pass therethrough and has high impedance with respect to signals having other frequencies.

The PIN diode 208, the inductor 219, and the capacitor 234 constitute the first switching circuit 247.

The PIN diode 209, the inductor 220, and the capacitor 236 constitute the second switching circuit 248. In the second switching circuit 248, when a forward voltage is applied to the PIN diode 209 to bring a low impedance state between an anode and a cathode thereof, the inductor 220 and the capacitor 236 resonate in parallel with each other to bring extremely high impedance between the second input terminal 266 and the second output terminal 268. When a forward voltage is not applied to the PIN diode 209 and the impedance between the anode and the cathode of the PIN diode 209 becomes high, the inductor 220 and the capacitor 236 do not resonate in parallel with each other to bring a low impedance state between the second input terminal 266 and the second output terminal 268. In the second switching circuit 248, a series circuit of the inductor 220 and the PIN diode 299 is electrically connected in parallel with the capacitor 236 between the second input terminal 266 and the second output terminal 268. This construction provides an effect of reducing the loss of the receiving signal when the receiving signal is received at the first antenna terminal 202.

The PIN diode 210, the inductor 221, and the capacitor 239 constitute the third switching circuit 249. A circuit constituted by the inductor 218, the resistor 226, and the capacitors 232 and 233 functions as an input matching circuit as well as a control circuit for the first switching circuit 247. A circuit constituted by the inductor 222, the resistor 227, the capacitors 237 and 238 function as an input matching circuit as well as a control circuit for the third switching circuit 249.

Hereinafter, the operation of the antenna switching device of the present example will be described.

When the transmitting signal is transmitted (first mode), a positive voltage is applied to the first control terminal 205, and no voltage is applied to the second control terminal 206. A control current flows through the first control terminal 205, the resistor 226, the inductor 218, the first switching circuit 247, the second switching circuit 248, and the inductor 223 in this order. Associated with the flow of the control current, the impedance between the first input terminal 262 and the first output terminal 264 of the first switching circuit 247 becomes low and the impedance between the second input terminal 266 and the second output terminal 268 of the second switching circuit 248 becomes high. Consequently, the transmitting signal input from the transmitting terminal 201 is outputted from the first antenna terminal 202 but is not outputted from the other terminals.

The antenna switching device of the present example has two receiving modes in addition to the above-mentioned transmitting mode. These receiving modes are classified into that receiving a signal from the first antenna terminal 202 (second mode) and that receiving a signal from the second antenna terminal 203 (third mode).

First, the operation of the mode for receiving a signal from the first antenna terminal 202 will be described.

When a signal is received from the first antenna terminal 202, no voltage is applied to the first control terminal 205 and the second control terminal 206. Since no control current flows through the device, the impedance between the first input terminal 262 and the first output terminal 264 of the first switching circuit 247 and between the third input terminal 270 and the third output terminal 272 of the third switching circuit 249 becomes high. Simultaneously, the impedance between the second input terminal 266 and the second output terminal 268 of the second switching circuit 248 becomes low. As a result, the receiving signal input from the first antenna terminal 202 is outputted from the receiving terminal 204 but is not outputted from the other terminals.

Next, the operation of the mode for receiving a signal at the second antenna terminal 203 will be described.

When a signal is received from the second antenna terminal 203, a positive voltage is applied to the first control terminal 205 and the second control terminal 206. A control current flows through the first control terminal 205, the resistor 226, the inductor 218, the first switching circuit 247, the second switching circuit 248, and the inductor 223 in this order. Simultaneously, the control current flows through the second control terminal 206, the resistor 227, the inductor 222, the third switching circuit 249, and the inductor 223 in this order. Associated with the flow of the control current, the impedance between the first input terminal 262 and the first output terminal 264 of the first switching circuit 247 and between the third input terminal 270 and the third output terminal 272 of the third switching circuit 249 becomes low, and the impedance between the second input terminal 266 and the second output terminal 268 of the second switching circuit 248 becomes high. Consequently, the receiving signal input from the second antenna terminal 203 is outputted from the receiving terminal 204, but is not outputted from the other terminals.

In the antenna switching device of Example 2 according to the present invention has the same function as that of Example 1. However, in the present example, the number of elements between the first antenna terminal and the receiving terminal is less than that of Example 1. Thus, the loss of the receiving signal in the circuit can be further minimized.

EXAMPLE 3

Figure 4:
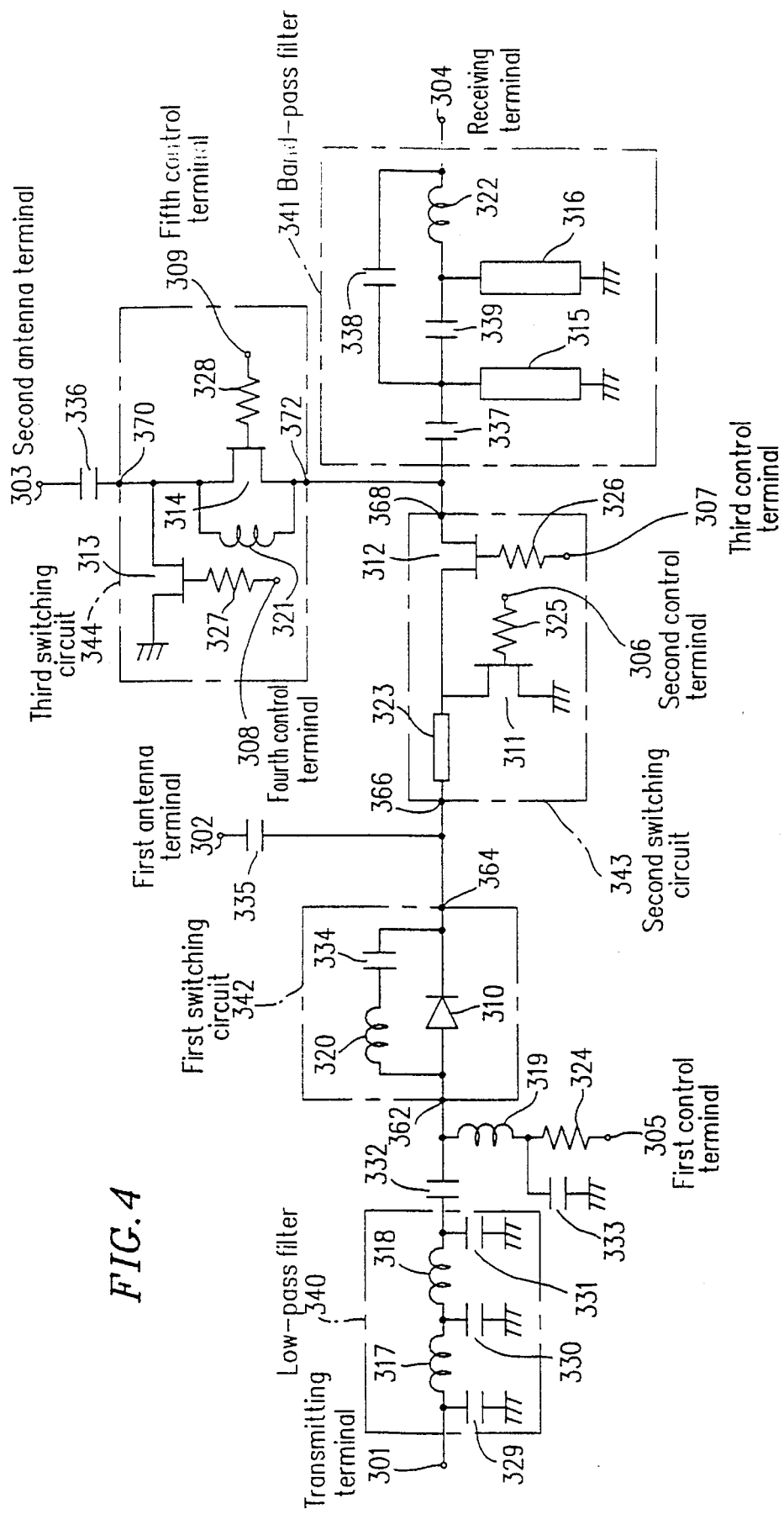
FIG. 4 is a circuit diagram of an antenna switching device of Example 3 according to the present invention.

Referring to FIG. 4, an antenna switching device of Example 3 according to the present invention includes a transmitting terminal 301 for receiving a transmitting signal, a first antenna terminal 302 connected to a first antenna, a second antenna terminal 303 connected to a second antenna, a receiving terminal 304 for outputting a receiving signal received from the first antenna terminal 302 and the second antenna terminal 303, a first control terminal 305 for receiving a first control signal, a second control terminal 306 for receiving a second control signal, a third control terminal 307 for receiving a third control signal, a fourth control terminal 308 for receiving a fourth control signal, and a fifth control terminal 309 for receiving a fifth control signal. The antenna switching device further includes a first switching circuit 342, a second switching circuit 343, a third switching circuit 344, a low-pass filter 340 electrically connected between the transmitting terminal 301 and the first switching circuit 342, and a band-pass falter 341 electrically connected between the second switching circuit 343 and the receiving terminal 304. The first switching circuit 342 has a first input terminal 362 electrically connected to the transmitting terminal 301 end a first output terminal 364 electrically connected to the first antenna terminal 302. The second switching circuit 343 has a second input terminal 366 electrically connected to the first antenna terminal 302, and a second output terminal 368 electrically connected to the receiving terminal 304. The third switching circuit 344 has a third input terminal 370 electrically connected to the second antenna terminal 303 and a third output terminal 372 electrically connected to the receiving terminal 304.

The first switching circuit 342, the second switching circuit 343, and the third switching circuit 344 constitute selecting means. The selecting means selects one mode among a first mode for outputting a signal corresponding to the transmitting signal to the first antenna terminal 302, a second mode for outputting a signal received at the first antenna to the receiving terminal 304, and a third mode for outputting a signal received at the second antenna to the receiving terminal 304. The selecting means selects the first mode when voltages having predetermined levels are respectively applied to the first, third, and fifth control terminals 305, 307, and 309, selects the second mode when voltages having predetermined levels are respectively applied to the second and fifth control terminals 306 and 309, and selects the third mode when voltages having predetermined levels are respectively applied to the third and fourth control terminals 307 and 308.

In FIG. 4, the reference numeral 310 denotes a PIN diode; 311, 312, 313, and 314 field effect transistors (FETs); 315 and 316 one end short-circuited dielectric coaxial resonators (dielectric resonators); 317, 318, 319, 320, 321, and 322 inductors; 323 a strip line; 324, 325, 326, 327, and 328 resistors; and 329, 330, 331, 332, 333, 334, 335, 336, 337, 338, and 339 capacitors.

The strip line 323 has a characteristic impedance of about 50Ω, and has a length of ¼ wavelength of a signal having a transmitting frequency.

The inductors 317 and 318 and capacitors 329, 330, and 331 constitute the low-pass filter 340. The low-pass filter 340 allows a signal having a frequency within and lower than a transmitting frequency band to pass therethrough and has high impedance with respect to higher harmonics of the transmitting signal. The dielectric resonators 315 and 316, the inductor 322, and the capacitors 337, 338, and 339 constitute the band-pass filter 341. The band-pass filter 341 allows a signal having a frequency within a receiving frequency band to pass therethrough and has high impedance with respect to signals having the other frequencies.

The PIN diode 310, the inductor 320, and the capacitor 334 constitute the first switching circuit 342. A circuit constituted by the inductor 319, the resistor 324, the capacitors 332 and 333 functions as an input matching circuit as well as a control circuit for the first switching circuit 342.

The FETs 311 and 312, the strip line 323, the control terminals 306 and 307, and the resistors 325 and 326 constitute the second switching circuit 343. In the case where a voltage is not applied to the second control terminal 306, the impedance between the drain and the source of the FET 311 becomes low, and one end of the strip line 323 is almost grounded, the second switching circuit 343 has an extremely high impedance with respect to the first antenna terminal 302.

The FETs 313 and 314, the control terminals 308 and 309, the inductor 321, and the resistors 327 and 328 constitute the third switching circuit 344. The resistance between the drain and the source of the FET 313 at low impedance is almost equal to a matched load.

In the first switching circuit 342, the PIN diode 310 allows a large signal to be transmitted therethrough with less distortion than when an FET is used.

Because of the construction in which the second switching circuit 343 and the third switching circuit 344 are respectively formed using a FET, electric power consumed by the antenna switching device becomes nearly zero at a time when a signal is received.

In the second switching circuit 343, one end of the strip line 323 is electrically connected to the second Input terminal 366, and the other end of the strip line 323 is electrically connected to the drain of the FET 311 and the drain of the FET 312. The source of the FET 311 is grounded and the source of the FET 312 is electrically connected to the second output terminal 368. Because of this configuration of the second switching circuit 343, electric power consumed by the second switching circuit 343 becomes almost zero and the deterioration of the isolation between the first antenna terminal 302 and the receiving terminal 304 is prevented at a time when a transmitting power is large.

In the third switching circuit 344, the resistance between a drain and a source of the FET 313 at low impedance is almost equal to a matched load. The drain of the FET 313 and the drain of the FET 314 are electrically connected to the third input terminal 370, the source of the FET 313 is grounded, and the source of the FET 314 is electrically connected to the third output terminal 372. Because of this configuration of the third switching circuit 344, when the impedance between the drain and the source of the FET 313 becomes low and the impedance between the drain and the source of the FET 314 becomes high, the second antenna terminal 303 becomes substantially connected to a matched load. Thus, when the transmitting signal is transmitted and when the receiving signal is received from the first antenna terminal 302, the interference between the first antenna connected to the first antenna terminal 302 and the second antenna connected to the second antenna terminal 303 can be prevented.

Figure 9:
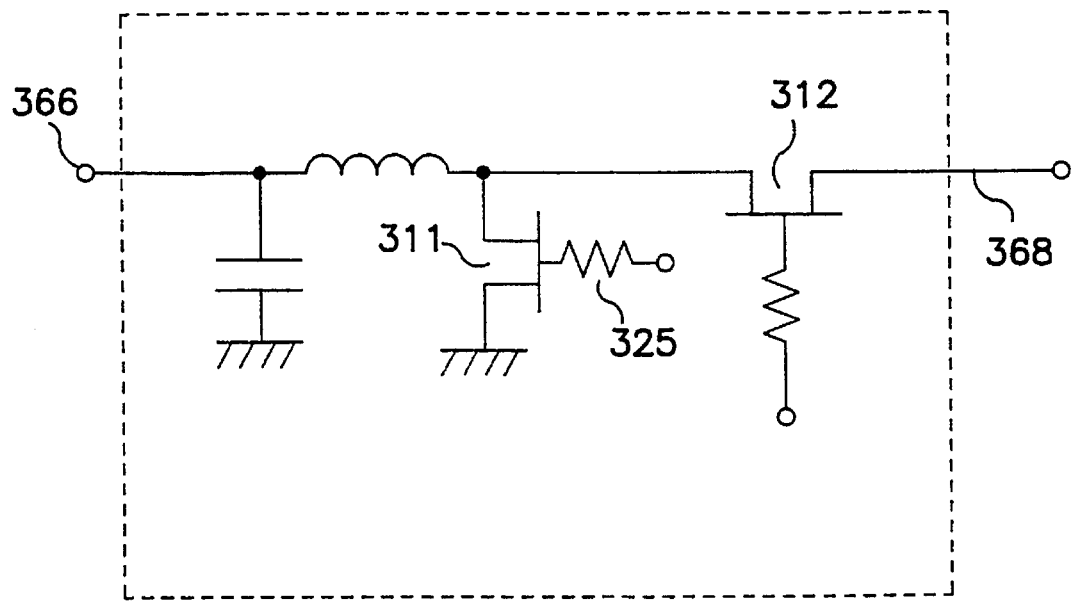
FIG. 9 is a circuit diagram of another embodiment of the second switching circuit for use in the antenna switching device of Example 3.

In the second switching circuit 343, the strip line 323 can be replaced by an inductor one end of which is connected the second input terminal 366 and the other end of which is connected to the drain of the FET 311 and a capacitor one end of which is connected to the second input terminal 366 and the other end of which is grounded as shown in FIG. 9. In this case, the same effects as those obtained when the strip line 323 is used can be obtained, and simultaneously the antenna switching device can be readily miniaturized.

Figure 10:
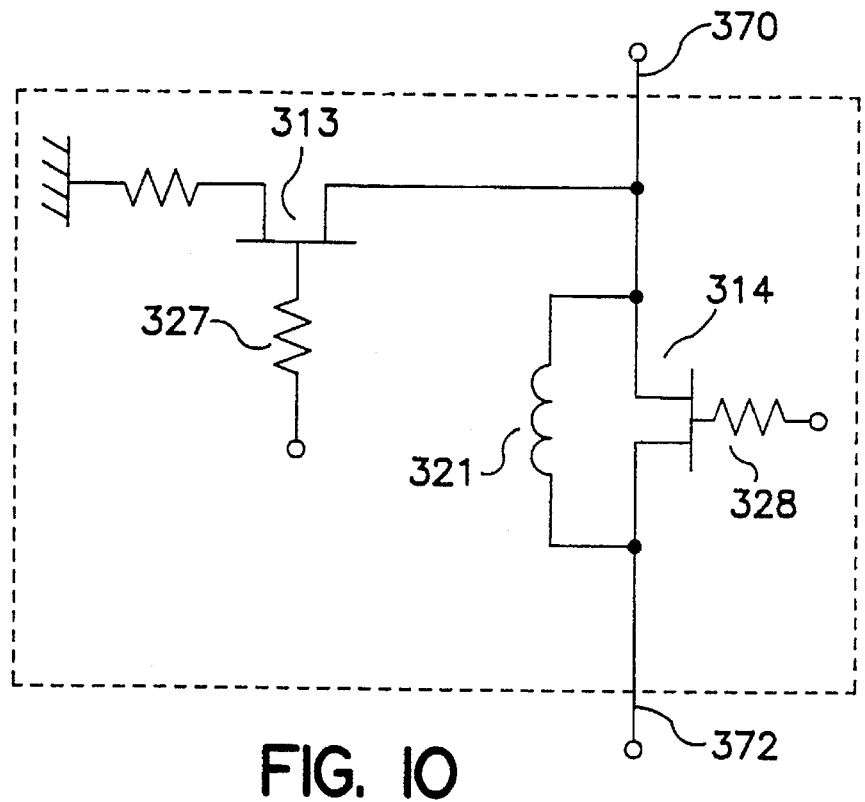
FIG. 10 is a circuit diagram of another embodiment of the third switching circuit for use in the antenna switching device of Example 3.

The same effects can also be obtained when one end of a resistor having a resistance nearly equal to the matched load is connected to the source of the FET 313 and the other end of the resistor is grounded, as shown in FIG. 10, instead of making the resistance between the drain and the source of the FET 313 at low impedance almost equal to the matched load.

In the case where the resistance between the drain and the source of the FET 313 at low impedance is made almost zero, although the second antenna terminal 303 will not be connected to a matched load, the isolation of the third switching circuit 344 at a time when the third switching circuit 344 is interrupted is increased. It is noted that when the FET 313 is removed from the third switching circuit 344, even though the above-mentioned effects are lost, the third switching circuit 344 retains required functions.

In the third switching circuit 344, one end of the inductor 321 is connected to the drain of the FET 314 and the other end of the inductor 321 is connected to the source of the FET 314. Because of this configuration, the impedance between the third input terminal 370 and the third output terminal 372 of the third switching circuit 344 can be increased at a time when the third switching circuit 344 is interrupted. The inductor 321 can be removed from the third switching circuit 344. However, even though the inductor 321 is removed and the impedance between the third input terminal 370 and the third output terminal 372 is decreased, the same function as that of the present example can be realized.

Hereinafter, the operation of the antenna switching device of the present example will be described.

When the transmitting signal is transmitted (first mode), a positive voltage is applied to the first control terminal 305, a negative voltage equal to or lower than a pinch off voltage is applied to the third and fifth control terminals 307 and 309, and no voltage is applied to the second and fourth control terminals 306 and 308. A control current flows through the first control terminal 305, the resistor 324, the inductor 319, the first switching circuit 342, the strip line 323, and the FET 311 in this order. When the control voltages are applied to the respective control terminals, the impedance between the first input terminal 362 and the first output terminal 364 of the first switching circuit 342 and between the drain and the source of the FETs 311 and 313 becomes low, and the impedance between the drain and the source of the FETs 312 and 314 becomes high. The low impedance state between the drain and the source of the FET 311 renders one end of the strap line 323 almost grounded. This causes the second switching circuit 343 to have extremely high impedance with respect to the first antenna terminal 302. As a result, the transmitting signal input from the transmitting terminal 301 is outputted from he first antenna terminal 302 but is not outputted from the other terminals. Furthermore at this time, the impedance between the drain and the source of the FET 313 becomes low and the impedance between the drain and the source of the FET 314 becomes high. Thus, the second antenna terminal 303 becomes substantially connected to a matched load.

The antenna switching device of the present example has two receiving modes in addition to the above-mentioned transmitting mode. These receiving modes are classified into that receiving a signal from the first antenna terminal 302 (second mode) and that receiving a signal from the second antenna terminal 303 (third mode).

First, the operation of the mode for receiving a signal at the first antenna terminal 302 will be described.

When a signal is received from the first antenna terminal 302, a negative voltage equal to or less than a pinch off voltage is applied to the second and fifth control terminals 306 and 309. At this time, no voltage is applied to the first, third, and fourth control terminals 305, 307, and 308. When such a control voltage is applied to the respective control terminals, the impedance between the first input terminal 362 and the first output terminal 364 of the first switching circuit 342 end between the drain and the source of the FETs 311 and 314 becomes high, and the impedance between the source and the drain of the FETs 312 and 313 becomes low. Consequently, the receiving signal input from the first antenna terminal 302 is outputted from the receiving terminal 304 but is not outputted from the other terminals. When the impedance between the drain and the source of the FET 313 becomes low and the impedance between the drain and the source of the FET 314 becomes high, the second antenna terminal 303 becomes substantially connected to a matched load.

Next, the operation of the mode for receiving a signal at the second antenna terminal 303 will be described.

When a signal is received from the second antenna terminal 303, a negative voltage equal to or less than a pinch off voltage is applied to the third control terminal 307 and the fourth control terminal 308. At this time, no voltage is applied to the first, second and fifth control terminals 305, 306, end 309. When such a control voltage is applied to the respective control terminals, the impedance between the first input terminal 362 and the first output terminal 364 of the first switching circuit 342 and between the drain end the source of the FETs 312 and 313 becomes high, and the impedance between the drain and the source of the FETs 311 and 314 becomes low. As a result, the receiving signal input from the second antenna terminal 303 is outputted from the receiving terminal 304 but is not outputted from the other terminals.

As described above, the antenna switching device in Example 3 according to the present invention has the same function as that of Example 1 according to the present invention, and in addition, the antenna switching device in Example 3 consumes almost no electric power when receiving a signal.

EXAMPLE 4

Figure 5:
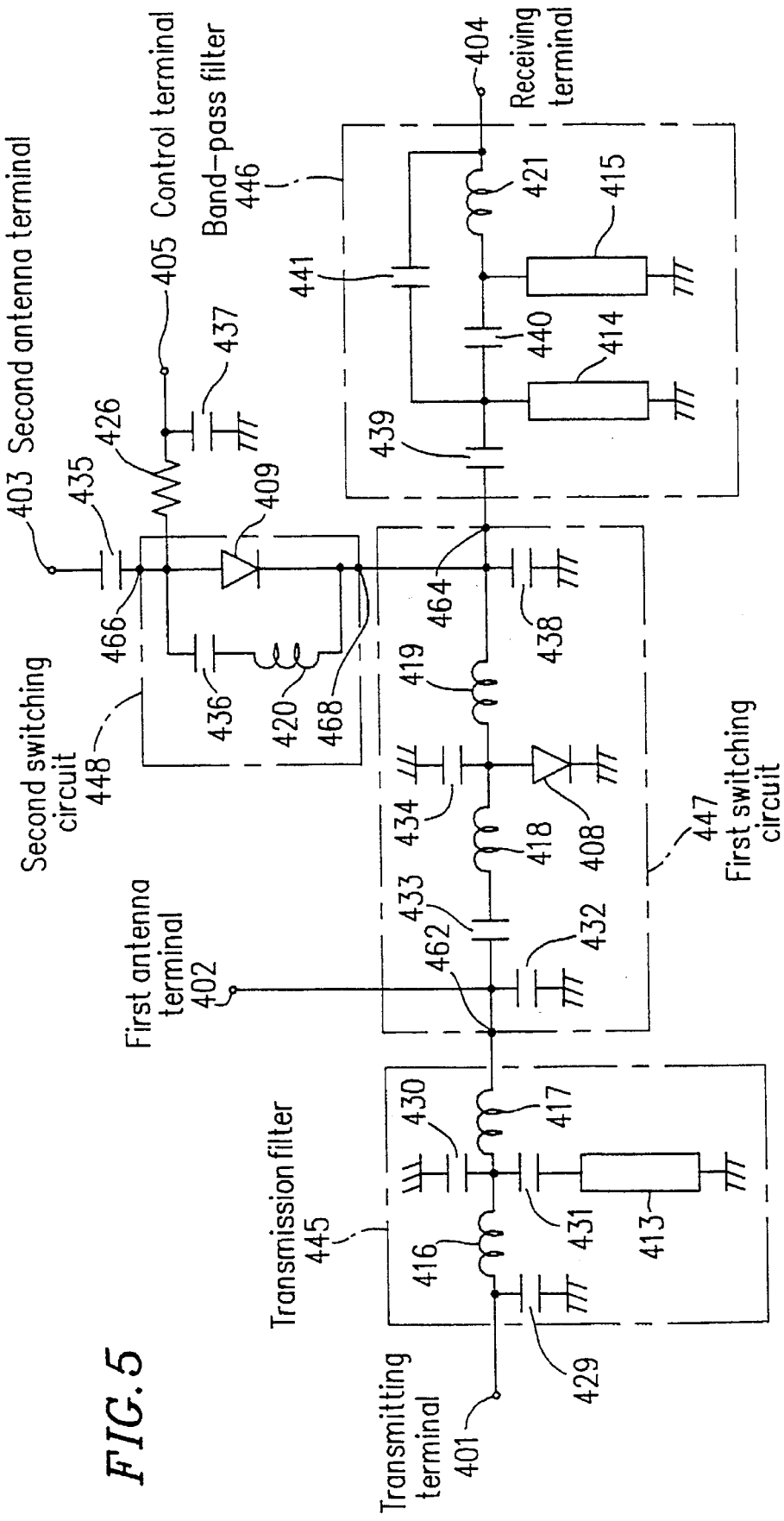
FIG. 5 is a circuit diagram of an antenna switching device of Example 4 according to the present invention.

Referring to FIG. 5, an antenna switching device of Example 4 according to the present invention includes a transmitting terminal 401 for receiving a transmitting signal, a first antenna terminal 402 connected to a first antenna, a second antenna terminal 403 connected to a second antenna, a receiving terminal 404 for outputting a receiving signal received from the first antenna terminal 402 and the second antenna terminal 403, and a control terminal 405 for receiving a control signal. The antenna switching device further includes a first switching circuit 447, a second switching circuit 448, a transmission filter 445 electrically connected between the transmitting terminal 401 and the first switching circuit 447, and a band-pass filter 446 electrically connected between the second switching circuit 448 and the receiving terminal 404. The first switching circuit 447 has a first input terminal 462 electrically connected to the transmitting terminal 401 and the first antenna terminal 402, and a first output terminal 464 electrically connected to the receiving terminal 404. The second switching circuit 448 has a second input terminal 466 electrically connected to the second antenna terminal 403 and a second output terminal 468 electrically connected to the receiving terminal 404.

The first switching circuit 447 and the second switching circuit 448 constitute selecting means. The selecting means selects one mode among a first mode for outputting a signal corresponding to the transmitting signal to the first antenna terminal 402, a second mode for outputting a signal received at the first antenna to the receiving terminal 404, and a third mode for outputting a signal received at the second antenna to the receiving terminal 404. The selecting means selects the first mode when a positive voltage is supplied to the control terminal 405, selects the second mode when no voltage is supplied to the control terminal 405, end selects the third mode when a positive voltage is supplied to the control terminal 405.

In FIG. 5, the reference numerals 408 and 409 denote PIN diodes; 413, 414 and 415 one end short-circuited dielectric coaxial resonators (dielectric resonators); 416, 417, 418, 419, 420, and 421 inductors; 426 a resistor; 429, 430, 431, 432, 433, 434, 435, 436, 437, 438, 439, 440, and 441 capacitors.

The dielectric resonator 413, the inductors 416 end 417, end the capacitors 429, 430, end 431 constitute the transmission filter 445. The transmission filter 445 allows a signal having a frequency within a transmitting frequency band of the transmitting signal to pass therethrough and has high impedance with respect to the receiving signal.

The dielectric resonators 414 and 415, the inductor 421, and the capacitors 439, 440, and 441 constitute the bend-pass filter 446. The band-pass filter 446 allows a signal having a frequency within a receiving frequency band to pass therethrough and has high impedance with respect to signals outside of the receiving frequency band.

The PIN diode 408, the inductors 418 and 419, and the capacitors 432, 433, 434, and 438 constitute the first switching circuit 447. In the first switching circuit 447, when a forward voltage is applied to the PIN diode 408 to bring a low impedance state between an anode and a cathode thereof, and a contact point between the inductors 418 and 419 is almost grounded, the inductor 418 and the capacitor 432 and the inductor 419 and the capacitor 438 respectively resonate in parallel with each other. As a result, the impedance between the first input terminal 462 and the second input terminal 464 becomes extremely high. The capacitor 433 is a DC blocking capacitor.

The PIN diode 409, the inductor 420, and the capacitor 436 constitute the second switching circuit 448.

The transmission filter 445 is constructed so as to allow a signal having a frequency within a transmitting frequency band to pass therethrough and to allow a signal having a frequency within a receiving signal frequency band to be attenuated. Because of this construction, the transmitting signal input from the transmitting terminal 401 is outputted from the first antenna terminal 402, and the receiving signal input from the first antenna terminal 402 is not outputted from the transmitting terminal 401. By providing the transmission falter 445 with low-pass characteristics in addition to the above-mentioned transmission characteristics, the transmission filter 445 will be capable of preventing the radiation of higher harmonics of the transmitting signal. Since the transmission filter 445 functions as a band-elimination filter using a dielectric resonator as well as a low-pass filter, the loss of the transmitting signal can be reduced and the circuit can be miniaturized, compared with the case of using a band-pass filter as the transmission filter 445. In the present example, a one-stage notch filter is used for the transmission filter 445. It is noted that when a multi-stage notch filter is used for the transmission filter 445, higher performance can be obtained.

Figure 12:
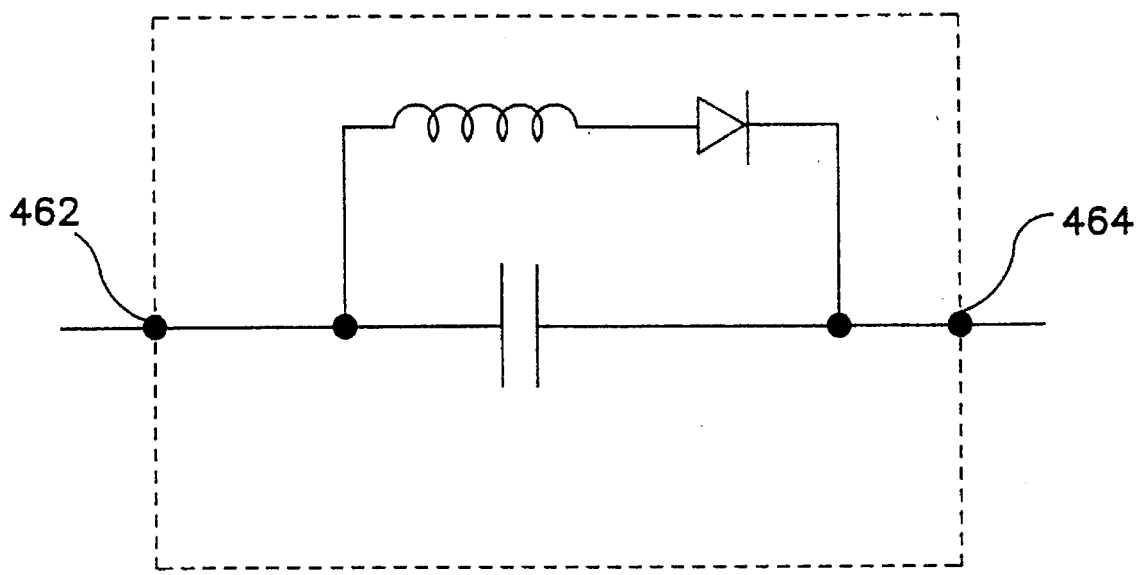
FIG. 12 is a circuit diagram of another embodiment of the first switching circuit for use in the antenna switching device of Example 4.

The antenna switching device of the present example will have the same function as that as described above, even though the first switching circuit 447 has the same configuration as that of the second switching circuit 248 in Example 2, as shown in FIG. 12.

Hereinafter, the operation of the antenna switching device of the present example will be described.

When the transmitting signal is transmitted from the first antenna (first mode), a positive voltage is applied to the control terminal 405. A control current flows through the control terminal 405, the resistor 426, the second switching circuit 448, the inductor 419, and the PIN diode 408 in this order. Associated with the flow of the control current, the impedance between the second input terminal 486 and the second output terminal 468 of the second switching circuit 448 and between an anode and a cathode of the PIN diode 408 becomes low. The low impedance state between the anode and the cathode of the PIN diode 408 renders a contact point between the inductors 418 and 419 almost grounded. This causes the inductor 418 and the capacitor 432 and the inductor 419 and the capacitor 438 to resonate in parallel with each other. As a result, the impedance between the first input terminal 462 and the first output terminal 464 of the first switching circuit 447 becomes extremely high. Since the transmission filter 445 allows a signal having a frequency within a transmitting frequency band to pass therethrough, the transmitting signal input from the transmitting terminal 401 passes through the transmission filter 445 and is outputted from the first antenna terminal 402, but is not outputted from the other terminals.

The antenna switching device of the present example has two receiving modes in addition to the above-mentioned transmitting mode. These receiving modes are classified into that receiving a signal at the first antenna terminal 402 (second mode) and that receiving a signal at the second antenna terminal 403 (third mode).

First, the operation of the mode for receiving a signal at the first antenna terminal 402 will be described.

When a signal is received at the first antenna terminal 402, no voltage is applied to the control terminal 405. Since no control current flows through the device, the impedance between the second input terminal 466 and the second output terminal 468 of the second switching circuit 448 and between the anode and the cathode of the PIN diode 408 becomes high. The impedance of the transmission filter 445 with respect to the first antenna terminal 402 is extremely high in the receiving frequency band. Consequently, the receiving signal input from the first antenna terminal 402 is outputted from the receiving terminal 404 and is not outputted from the other terminals.

Next, the operation of the mode for receiving a signal at the second antenna terminal 403 will be described.

When a signal is received at the second antenna terminal 403, a positive voltage is applied to the control terminal 405. A control current flows through the control terminal 405, the resistor 426, the second switching circuit 448, the inductor 419, end the PIN diode 408 in this order. Associated with the flow of the control current, the impedance between the second input terminal 466 and the second output terminal 468 of the second switching circuit 448 and between the anode and the cathode of the PIN diode 408 becomes low. The low impedance state between the anode and the cathode of the PIN diode 408 renders the contact point between the inductors 418 and 419 almost grounded. This causes the inductor 418 and the capacitor 432 and the inductor 419 and the capacitor 438 to resonate in parallel with each other. Consequently, the impedance between the input terminal 462 and the output terminal 464 of the first switching circuit 447 becomes extremely high. Consequently, the receiving signal input from the second antenna terminal 403 is outputted from the receiving terminal 404 but is not outputted from the other terminals.

The antenna switching device in Example 4 according to the present invention has the same function as that of Example 1, using less number of PIN diodes compared with that of Example 1.

EXAMPLE 5

Figure 6:
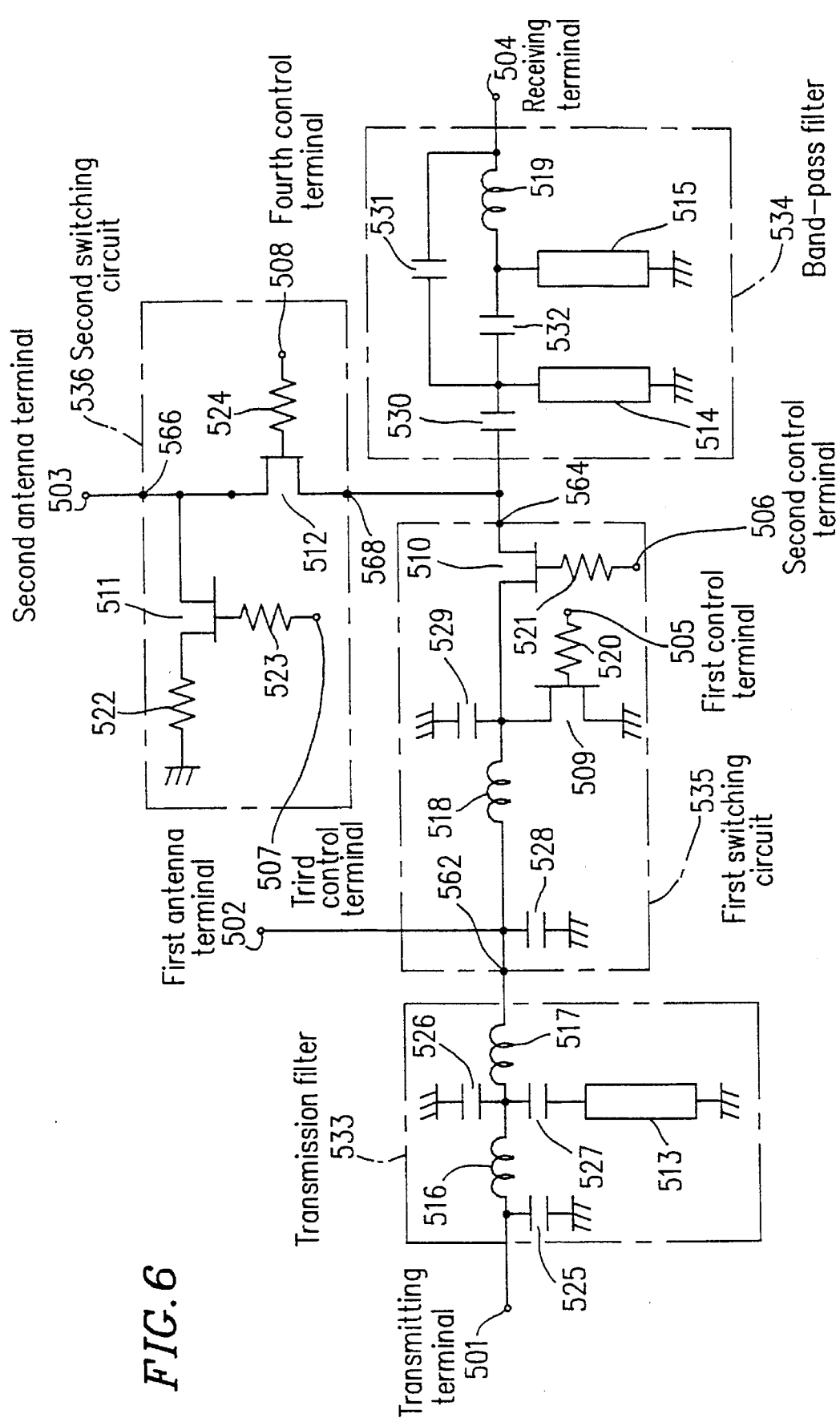
FIG. 6 is a circuit diagram of an antenna switching device of Example 5 according to the present invention.

Referring to FIG. 6, an antenna switching device in Example 5 according to the present invention includes a transmitting terminal 501 for receiving a transmitting signal, a first antenna terminal 502 connected to a first antenna, a second antenna terminal 503 connected to a second antenna, a receiving terminal 504 for outputting a receiving signal received from the first antenna terminal 502 and the second antenna terminal 503, a first control terminal 505 for receiving a first control signal, a second control terminal 506 for receiving a second control signal, a third control terminal 507 for receiving a third control signal, and a fourth control terminal 508 for receiving a fourth control signal. The antenna switching device further includes a first switching circuit 535, a second switching circuit 536, a transmission filter 533 electrically connected between the transmitting terminal 501 and the first switching circuit 535, and a band-pass filter 534 electrically connected between the second switching circuit 536 and the receiving terminal 504. The first switching circuit 535 has a first input terminal 562 electrically connected to the transmitting terminal 501 end the first antenna terminal 502, end a first output terminal 564 electrically connected to the receiving terminal 504. The second switching circuit 536 has a second input terminal 566 electrically connected to the second antenna terminal 503 and a second output terminal 568 electrically connected to the receiving terminal 504.

The first switching circuit 535 and the second switching circuit 536 constitute selecting means. The selecting means selects one mode among a first mode for outputting a signal corresponding to the transmitting signal to the first antenna terminal 502, a second mode for outputting a signal received from the first antenna to the receiving terminal 504, and a third mode for outputting a signal received from the second antenna to the receiving terminal 504. The selecting means selects the first mode when a voltage having a predetermined level is respectively supplied to the second and fourth control terminals 506 and 508, and the first and third control terminals 505 and 507 are grounded, selects the second mode when voltages having predetermined levels are respectively supplied to the first and fourth control terminals 506 and 507 are grounded, and selects the third mode when voltages having a predetermined levels are supplied to the second and third control terminals 506 and 507, and the first and fourth control terminals 505 and 508 are grounded.

In FIG. 6, the reference numerals 509, 510, 511, and 512 denote FETs; 513, 514, and 515 one end short-circuited dielectric coaxial resonators (dielectric resonators); 516, 517, 518, and 519 inductors; 520, 521, 522, 523, and 524 resistors; and 525, 526, 527, 528, 529, 530, 531, and 532 capacitors.

The dielectric resonator 513, the inductors 516 and 517, and the capacitors 525, 526, and 527 constitute the transmission filter 533. The transmission filter 533 allows a signal having a frequency within a transmitting frequency band to pass therethrough and has high impedance with respect to the receiving signal.

The dielectric resonators 514 and 515, the inductor 519, and the capacitors 530, 531, and 532 constitute the band-pass filter 534. The band-pass filter 534 allows a signal having a frequency within a receiving frequency band and has high impedance with respect to signals having a frequency outside of the receiving frequency band.

The FETS 509 and 510, the inductor 518, the resistors 520 and 521, and the capacitors 528 and 529 constitute the first switching circuit 535. In the first switching circuit 535, when the impedance between a drain and a source of the FET 509 becomes low and one end of the inductor 518 is almost grounded, the inductor 518 and the capacitor 528 resonate in parallel with each other. Consequently, the impedance of the first switching circuit 535 with respect to the first antenna terminal 502 becomes extremely high.

The FETs 511 and 512, the resistors 522, 523, and 524 constitute the second switching circuit 536.

In the first switching circuit 535, one end of the inductor 518 and one end of the capacitor 528 are electrically connected to the first input terminal 562. The other end of the capacitor 528 is grounded and the other end of the inductor 518 is electrically connected to the drain of the FET 509 and the drain of the FET 510. The source of the FET 509 is grounded, and the source of the FET 510 is electrically connected to the first output terminal 564. Because of this configuration of the first switching circuit 535, electric power consumed by the first switching circuit 535 becomes almost zero and the deterioration of the isolation between the first antenna terminal 502 and the receiving terminal 504 is prevented at a time when a transmitting power is large.

In the second switching circuit 536, the resistance of the resistor 522 has resistance almost equal to a matched load. Since the second antenna terminal 503 is substantially connected to a matched load at a time when the impedance between the drain and the source of the FET 511 is low, unwanted interference between the antenna connected to the first antenna terminal 502 and the antenna connected to the second antenna terminal 503 can be prevented, when the transmitting signal is transmitted and the receiving signal is received at the first antenna terminal 502.

Figure 13:
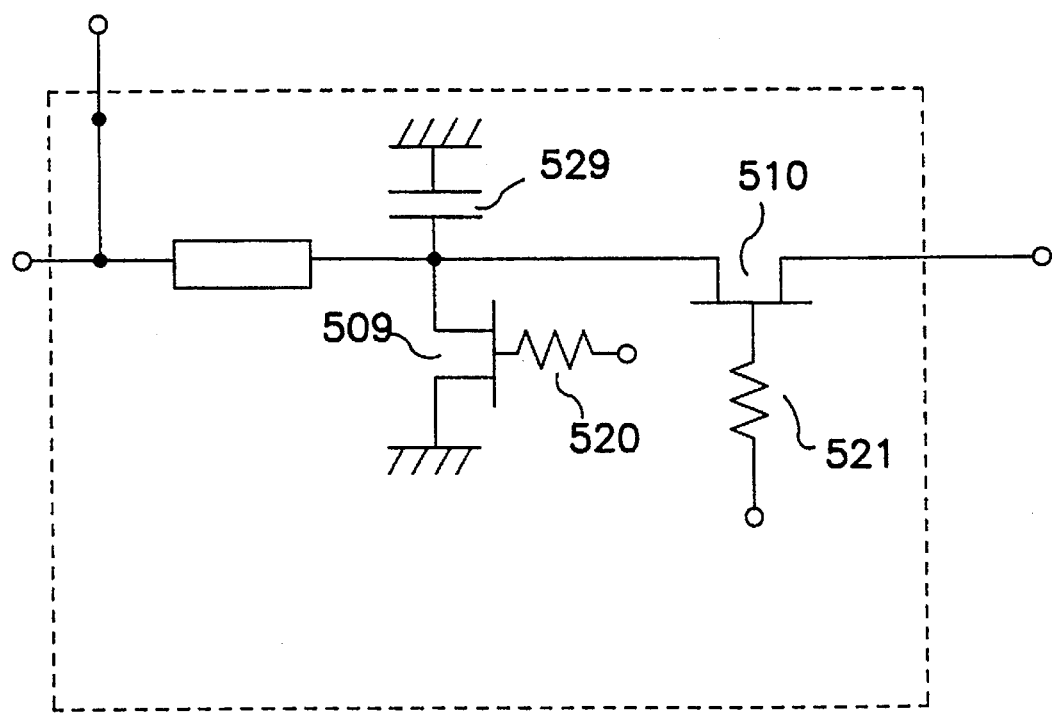
FIG. 13 is a circuit diagram of another embodiment of the first switching circuit for use in the antenna switching device of Example 5.

Even though a quarter-wave transmission section is substituted for the inductor 518 and the capacitor 528 as shown in FIG. 13, the same effects as those of the above can be obtained.

The resistance between the drain and the source of the FET 511 at low impedance can be made almost equal to a matched load. Even in this case, the second antenna terminal 503 can be substantially connected to a matched load, when the transmitting signal is transmitted and the receiving signal is received the first antenna terminal 502. However, the matched load can be more readily regulated when the resistor 522 having a resistance almost equal to the matched load is connected to the source of the FET 511.

Figure 11:
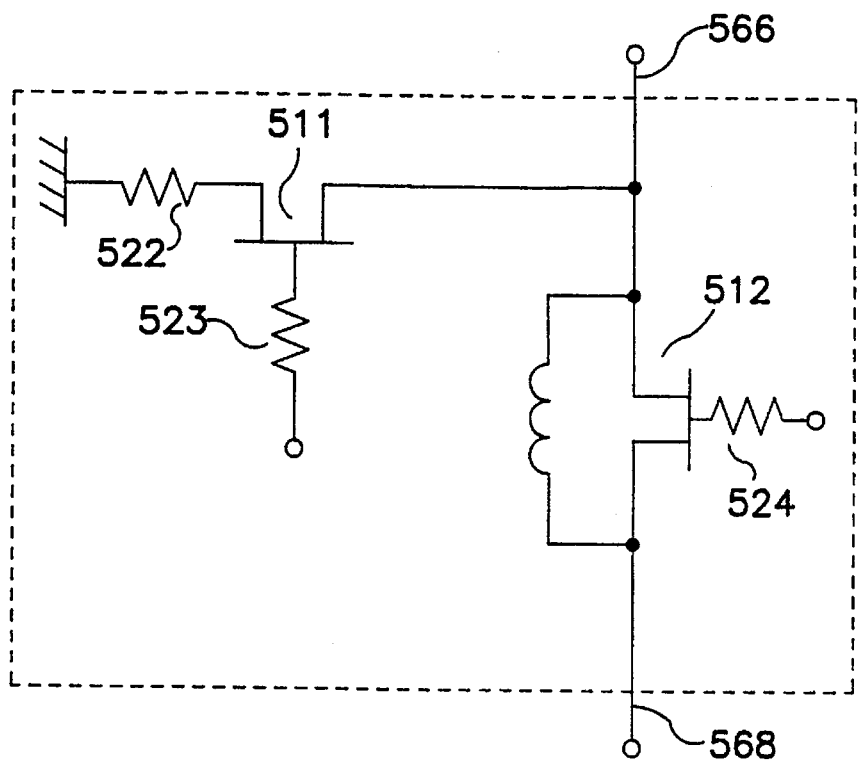
FIG. 11 is a circuit diagram of another embodiment of the second switching circuit for use in the antenna switching device of Example 5.

When an inductor is connected between the drain of the FET 512 and the source of the FET 512 in the second switching circuit 536 as shown in FIG. 11, the isolation of the second switching circuit 536 at a time when the second switching circuit 536 is interrupted can be increased. In the case where the FET 511 and the resistor 522 are removed from the second switching circuit 536, although the above-mentioned effects are lost, the second switching circuit 536 still retains the required function.

Hereinafter, the operation of the antenna switching device of the present example will be described.

When the transmitting signal is transmitted from the first antenna terminal 502 (first mode), a negative voltage equal to or less than a pinch-off voltage is applied to the second and fourth control terminals 506 and 508, and the first and third control terminals 505 end 507 are grounded. When the control voltage is applied to the respective control terminals, the impedance between the drain and the source of the FETs 510 and 512 becomes high, and the impedance between the drain and the source of the FETs 509 and 511 becomes low. The low impedance state between the drain and the source of the FET 509 renders one terminal of the inductor 518 almost grounded, so that the inductor 518 and the capacitor 528 resonate in parallel with each other. Consequently, the impedance of the first switching circuit 535 with respect to the first antenna terminal 502 becomes extremely high. The transmission filter 533 allows a signal having a frequency within transmitting frequency band to pass therethrough. Because of this, the transmitting signal input from the transmitting terminal 501 passes through the transmission filter 533 and is outputted from the first antenna terminal 502 but is not outputted from the other terminals.

In the first mode, the impedance between the drain and the source of the FET 511 becomes low, the second antenna terminal 503 is connected to the resistor 522 one end of which is grounded, and the impedance between the drain and the source of the FET 512 becomes high, whereby the second antenna terminal 503 becomes substantially connected to a matched load.

The antenna switching device of the present example has two receiving modes in addition to the above-mentioned transmitting mode. These receiving modes are classified into that receiving a signal at the first antenna terminal 502 (second mode) and that receiving a signal at the second antenna terminal 503 (third mode).

First, the operation of the second mode will be described.

When a signal is received at the first antenna terminal 502, a negative voltage equal to or less than a pinch off voltage is applied to the first end fourth control terminals 505 and 508, and the second and third control terminals 506 and 507 are grounded. When the control voltage is applied to the respective control terminals, the impedance between the drain and the source of the FETs 509 and 512 becomes high, and the Impedance between the drain and the source of the FETs 510 and 511 becomes low. As a result, the impedance between the first input terminal 562 and the first output terminal 564 of the first switching circuit 535 becomes low, and the second switching circuit 536 has high Impedance with respect to the first switching circuit 535. The impedance of the transmission filter 533 with respect to the first antenna terminal 502 is extremely high within a receiving frequency band. Consequently, the receiving signal input from the first antenna terminal 502 is outputted from the receiving terminal 504, but is not outputted from the other terminals.

In the second mode, the impedance between the drain and the source of the FET 511 becomes low, the second antenna terminal 503 is connected to the resistor 522 one end of which is grounded, and the impedance between the drain and the source of the FET 512 becomes high, whereby the second antenna terminal 503 becomes substantially connected to a matched load.

Next, the operation of the third mode will be described.

When a signal is received at the second antenna terminal 503, a negative voltage equal to or less than a pinch off voltage is applied to the second and third control terminals 506 and 507, and the first and fourth control terminals 505 and 508 are grounded. When the control voltage is applied to the respective control terminals, the impedance between the drain and the source of the FETs 510 and 511 becomes high, and the impedance between the drain and the source of the FETs 509 and 512 becomes low. Consequently, the first switching circuit 535 has high impedance with respect to the second switching circuit 536, and the impedance between the second input terminal 566 and the second output terminal 568 of the second switching circuit 536 becomes low. As a result, the receiving signal input from the second antenna terminal 503 is outputted from the receiving terminal 504 but is not output from the other terminals.

As described above, the antenna switching device in Example 5 according to the present invention has the same function as that of Example 1, and consumes almost no power.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An antenna switching device comprising:

a transmitting terminal for receiving a transmitting signal;

a first antenna terminal connected to a first antenna;

a second antenna terminal connected to a second antenna;

a receiving terminal for outputting receiving signals received at the first antenna terminal and the second antenna terminal; and selecting means for selecting one mode among a first mode for outputting a transmitting signal from the transmitting terminal to the first antenna terminal, a second mode for outputting the receiving signal from the first antenna terminal to the receiving terminal, and a third mode for outputting the receiving signal from the second antenna terminal to the receiving terminal;

wherein the first, second and third modes are exclusive to each other, and the selecting means cannot select another mode in which the transmitting signal from the transmitting terminal is outputted to the second antenna terminal and the receiving terminal is not connected to the transmitting terminal.

2. An antenna switching device according to claim 1, wherein the selecting means comprises:

a first switching circuit having a first input terminal electrically connected to the transmitting terminal, and a first output terminal electrically connected to the first antenna terminal;

a second switching circuit having a second input terminal electrically connected to the first antenna terminal, and a second output terminal electrically connected to the receiving terminal; and a third switching circuit having a third input terminal electrically to connected to the second antenna terminal, and a third output terminal electrically connected to the receiving terminal;

wherein the selecting means does not include another switching circuit connected to the transmitting terminal and the second antenna terminal.

3. An antenna switching device according to claim 2, wherein, when the selecting means selects the first mode, an electrical conduction is brought between the first input terminal and the first output terminal of the first switching circuit, and the second input terminal of the second switching circuit is electrically disconnected from the second output terminal thereof, when the selecting means selects the second mode, the first input terminal of the first switching circuit is electrically disconnected from the first output terminal thereof, an electrical conduction is brought between the second input terminal and the second output terminal of the second switching circuit, and the third input terminal of the third switching circuit is electrically disconnected from the third output terminal thereof, and when the selecting means selects the third mode, the second input terminal of the second switching circuit is electrically disconnected from the second output terminal thereof, and an electrical conduction is brought between the third input terminal of the third switching circuit and the third output terminal thereof.

4. An antenna switching device according to claim 2, comprising:

a low-pass filter electrically connected between the transmitting terminal and the first switching circuit, for selectively allowing only a signal component of the transmitting signal having a frequency lower than a predetermined frequency to pass therethrough; and a reception filter electrically connected between the second switching circuit and the receiving terminal, for allowing only a signal component of the receiving signal having a frequency within a predetermined frequency band to pass therethrough.

5. An antenna switching device according to claim 4, wherein the reception filter is a band-pass filter with attenuation poles.

6. An antenna switching device according to claim 2, wherein the first switching circuit has a first PIN diode connected between the first input terminal and the first output terminal, and the third switching circuit has a second PIN diode connected between the third input terminal and the third output terminal.

7. An antenna switching device according to claim 6, wherein the first switching circuit has a series circuit of an inductor and a capacitor, connected in parallel with the first PIN diode between the first input terminal and the first output terminal, and the third switching circuit has a series circuit of an inductor and a capacitor, connected in parallel with the second PIN diode between the third input terminal and the third output terminal.

8. An antenna switching device according to claim 2, wherein the third switching circuit has an FET (field effect transistor), and a drain terminal and a source terminal of the FET are electrically connected between the third input terminal and the third output terminal.

9. An antenna switching device according to claim 8, wherein the third switching circuit has an inductor, one end of the inductor is electrically connected to the drain terminal of the FET, and another end of the inductor is electrically connected to the source terminal of the FET.

10. An antenna switching device according to claim 2, wherein the second switching circuit has first and second inductors connected between the second input terminal and the second output terminal, a first capacitor connected between the second input terminal and a ground, a second capacitor connected between the second output terminal and the ground, and a PIN diode connected between the ground and a contact point between the first inductor and the second inductor.

11. An antenna switching device according to claim 2, wherein the second switching circuit has a first quarter-wave transmission section, a second quarter-wave transmission section, and a PIN diode, one end of the first quarter-wave transmission section is electrically connected to the second input terminal, one end of the PIN diode and one end of the second quarter-wave transmission section are electrically connected to another end of the first quarter-wave transmission section, another end of the PIN diode is grounded, and another end of the second quarter-wave transmission section is electrically connected to the second output terminal.

12. An antenna switching device according to claim 2, wherein the second switching circuit has a series circuit of an inductor and a PIN diode, electrically connected between the second input terminal and the second output terminal, and a capacitor electrically connected between the second input terminal and the second output terminal and connected in parallel with the series circuit.

13. An antenna switching device according to claim 2, wherein the first switching circuit has a PIN diode, and the second and third switching circuits have FETs.

14. An antenna switching device according to claim 2, wherein the second switching circuit has an inductor, a capacitor, a first FET, and second FET, one end of the inductor and one end of the capacitor are respectively electrically connected to the second input terminal, another end of the capacitor is grounded, another end of the inductor is electrically connected to a drain terminal of the first FET and a drain terminal of the second FET, a source terminal of the first FET is grounded, and a source terminal of the second FET is electrically connected to the second output terminal.

15. An antenna switching device according to claim 2, wherein the second switching circuit has a quarter-wave transmission section, a first FET, and a second FET, one end of the quarter-wave transmission section is electrically connected to the second input terminal, another end of the quarter-wave transmission section is electrically connected to a drain terminal of the first FET and a drain terminal of the second FET, a source terminal of the first FET is grounded, and a source terminal of the second FET is electrically connected to the second output terminal.

16. An antenna switching device according to claim 2, wherein the third switching circuit has a first FET and a second FET, a drain terminal of the first FET and a drain terminal of the second FET are electrically connected to the third input terminal, a source terminal of the first FET is grounded, and the third output terminal is electrically connected to a source terminal of the second FET.

17. An antenna switching device according to claim 2, wherein the third switching circuit has a first FET, a second FET, and a resistor having resistance nearly equal to a matched load, a drain terminal of the first FET and a drain terminal of the second FET are electrically connected to the third input terminal, a source terminal of the first FET is connected to one end of the resistor, another end of the resistor is grounded, and a source terminal of the second FET is electrically connected to the third output terminal.

18. An antenna switching device according to claim 2, wherein the third switching circuit has a first FET and a second FET, resistance between a drain terminal and a source terminal of the first FET in an ON state is nearly equal to a matched load, the drain terminal of the first FET and a drain terminal of the second FET are electrically connected to the third input terminal, the source terminal of the first FET is grounded, and a source terminal of the second FET is electrically connected to the third output terminal.

19. An antenna switching device according to claim 1, comprising: a transmission filter electrically connected between the transmitting terminal and the first antenna terminal; and a reception filter having a circuit portion electrically connected between the second antenna terminal and the receiving terminal and having a dielectric resonator electrically connected to the receiving terminal.

20. An antenna switching device according to claim 19, comprising a substrate having a first portion on which the transmission filter is formed, a second portion on which the circuit portion of the reception filter is formed, and a third portion on which the dielectric resonator of the reception filter is formed, wherein the third portion of the substrate is interposed between the first portion and the second portion.

21. An antenna switching device comprising:

a transmitting terminal for receiving a transmitting signal;

a first antenna terminal connected to a first antenna;

a second antenna terminal connected to a second antenna;

a receiving terminal for outputting receiving signals received at the first antenna terminal and the second antenna terminal;

selecting means for selecting one mode among a first mode for outputting the receiving signal from the first antenna terminal to the receiving terminal, and a second mode for outputting the receiving signal from the second antenna terminal to the receiving terminal, said selecting means having a first switching circuit including a first input terminal electrically connected to the first antenna terminal and a first output terminal electrically connected to the receiving terminal, and a second switching circuit including a second input terminal electrically connected to the second antenna terminal and a second output terminal electrically connected to the receiving terminal; and is a transmission filter electrically connected between the transmitting terminal and the first antenna terminal, for allowing a signal component having a frequency within a transmitting frequency band to pass there through and having a high impedance with respect to a signal component having a frequency within a receiving frequency band;

wherein the first and second modes are exclusive to each other, wherein the first switching circuit is provided between the first antenna terminal and the receiving terminal, and the second switching circuit is provided between the second antenna terminal and the receiving terminal; and wherein no switching circuit is included between the transmitting terminal and the first antenna terminal.

22. An antenna switching device according to claim 21, wherein the second switching circuit has a first FET, a second FET, and a resistor having resistance nearly equal to matched load, a drain terminal of the first FET and a drain terminal of the second FET are electrically connected to the second input terminal, one end of the resistor is connected to a source terminal of the first FET, another end of the resistor is grounded, and a source terminal of the second FET is electrically connected to the second output terminal.

23. An antenna switching device according to claim 21, comprising a reception filter electrically connected between the first switching circuit and the receiving terminal.

24. An antenna switching device according to claim 23, wherein the reception filter selectively allows a signal component of the receiving signal having a frequency within a predetermined frequency band to pass therethrough.

25. An antenna switching device according to claim 24, wherein the reception filter is a band-pass filter with attenuation poles.

26. An antenna switching device according to claim 21, wherein the transmission filter further has a low-pass characteristic.

27. An antenna switching device according to claim 26, wherein the transmission filter has a band-stop filter and a low-pass filter.

28. An antenna switching device according to claim 21, wherein the second switching circuit has a PIN diode electrically connected between the second input terminal and the second output terminal.

29. An antenna switching device according to claim 28, wherein the second switching circuit has a series circuit of an inductor and a capacitor, electrically connected between the second input terminal and the second output terminal, and the PIN diode is connected in parallel with the series circuit.

30. An antenna switching device according to claim 21, wherein the second switching circuit has a FET having a drain terminal and a source terminal electrically connected between the second input terminal and the second output terminal, and a control signal for controlling the FET is input to a gate terminal of the FET.

31. An antenna switching device according to claim 30, wherein the second switching circuit has an inductor, one end of which is connected to the drain terminal of the FET and another end of which is connected to the source terminal of the FET.

32. An antenna switching device according to claim 21, wherein the first switching circuit has a first inductor, a second inductor, a first capacitor, a second capacitor, and a PIN diode, one end of the first inductor and one end of the first capacitor are electrically connected to the first input terminal, another end of the first capacitor is grounded, one end of the PIN diode and one end of the second inductor are electrically connected to another end of the first inductor, another end of the PIN diode is grounded, another end of the second inductor and one end of the second capacitor are electrically connected to the first output terminal, and another end of the second capacitor is grounded.

33. An antenna switching device according to claim 21, wherein the second switching circuit has a first FET and a second FET, resistance between a drain terminal and a source terminal of the first FET in an ON state is nearly equal to a matched load, the drain terminal of the first FET end a drain terminal of the second FET are electrically connected to the first input terminal, the source terminal of the first FET is grounded, and a source terminal of the second FET is electrical connected to the second output terminal.

34. An antenna switching device according to claim 21, wherein the first switching circuit has a series circuit of an inductor and a PIN diode, electrically connected between the first input terminal and the first output terminal, and a capacitor electrically connected between the first input terminal and the first output terminal and connected in parallel with the series circuit.

35. An antenna switching device according to claim 21, wherein the first switching circuit has an inductor, a capacitor, a first FET, and a second FET, one end of the inductor and one end of the capacitor are electrically connected to the first input terminal, another end of the capacitor is grounded, a drain terminal of the first FET and a drain terminal of the second FET are electrically connected to another end of the inductor, a source terminal of the first FET is grounded, and a source terminal of the second FET is electrically connected to the first output terminal.

36. An antenna switching device according to claim 21, wherein the first switching circuit has a quarter-wave transmission section, a first FET, a second FET, one end of the quarter-wave transmission section is electrically connected to the first input terminal, another end of the quarter-wave transmission section is electrically connected to drain terminal of the first FET and a drain terminal of the second FET, a source terminal of the first FET is grounded, and a source terminal of the second FET is electrically connected to the first output terminal.

37. An antenna switching device according to claim 21, wherein the second switching circuit has a first FET and a second FET, a drain terminal of the first FET and a drain terminal of the second FET are electrically connected to the second input terminal, a source terminal of the first FET is grounded, and a source terminal of the second FET is electrically connected to the second output terminal.

* * * * *

UNITED STATES PATENT AND TRADE MARK OFFICE
CERTIFICATE OF CORRECTION

PATENT NO. : 5,594,394
DATED : January 14, 1997
INVENTOR(S) : Sasaki et al.

It is certified that error appears in the above-identified patent and that said Letters Patent is hereby corrected as shown below:

On the cover page, item [56] References Cited, Foreign Patent Documents, delete "0104324  3/1991  Japan " and insert therefor --3-104324  5/1991..Japan--.

Column 21, line 59, delete "is".

Signed and Sealed this

Tenth Day of June, 1997

*Attest:*

BRUCE LEHMAN

*Attesting Officer*    *Commissioner of Patents and Trademarks*